United States Patent [19]

Yoshida et al.

[11] Patent Number: 5,726,765
[45] Date of Patent: Mar. 10, 1998

[54] DATA COMMUNICATION APPARATUS FOR SETTING THE BAUD RATE AND BIT RATE OF A MODEM AND PERFORMING DATA COMMUNICATION AT THE SET BAUD RATE AND BIT RATE

[75] Inventors: Takehiro Yoshida, Tokyo; Naoji Hayakawa, Machida; Toru Maeda, Mitaka; Toshio Kenmochi, Yokohama; Shigeki Ohno, Machida; Yoshio Yoshiura, Kanagawa-ken; Kazutaka Matsueda, Yokohama; Motoaki Yoshino, Fujisawa; Fumiyuki Takiguchi, Yokohama; Kazuto Yanagisawa, Toride; Hideki Shimizu, Yokohama, all of Japan

[73] Assignee: Canon Kabushiki Kaisha, Japan

[21] Appl. No.: 573,999

[22] Filed: Dec. 18, 1995

[30] Foreign Application Priority Data

Dec. 22, 1994 [JP] Japan .................... 6-336086

[51] Int. Cl.⁶ .................. H04N 1/36; H04N 1/00
[52] U.S. Cl. .......... 358/412; 358/434; 358/435; 375/222; 379/100
[58] Field of Search .................... 358/412, 434, 358/405, 406, 468, 437, 435, 436, 438, 439, 409; 375/222; 379/100, 90; 395/880; 364/270

[56] References Cited

U.S. PATENT DOCUMENTS

| 5,230,071 | 7/1993 | Newman | 395/880 |
|---|---|---|---|
| 5,297,186 | 3/1994 | Dong . | |
| 5,307,179 | 4/1994 | Yoshida | 358/440 |
| 5,351,134 | 9/1994 | Yaguchi et al. | 358/405 |
| 5,406,388 | 4/1995 | Matsuzaki | 358/434 |
| 5,438,427 | 8/1995 | Yoshida | 358/405 |
| 5,491,565 | 2/1996 | Naper | 358/468 |

Primary Examiner—Edward L. Coles, Sr.
Assistant Examiner—Fan Lee
Attorney, Agent, or Firm—Fitzpatrick, Cella, Harper & Scinto

[57] ABSTRACT

In a data communication apparatus, the baud rate and the bit rate of a modem thereof are set independently of each other according to the condition of data communication. Thus, optimum data communication suited to the line condition can be performed.

8 Claims, 12 Drawing Sheets

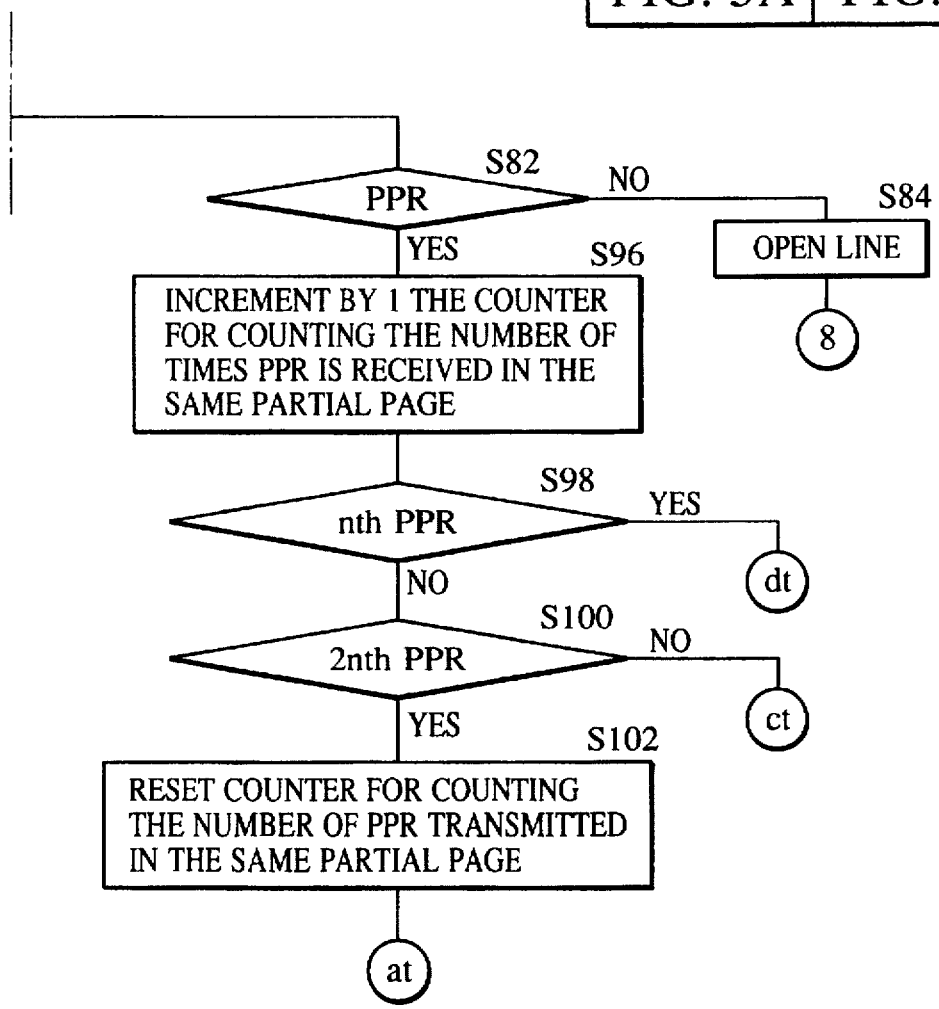

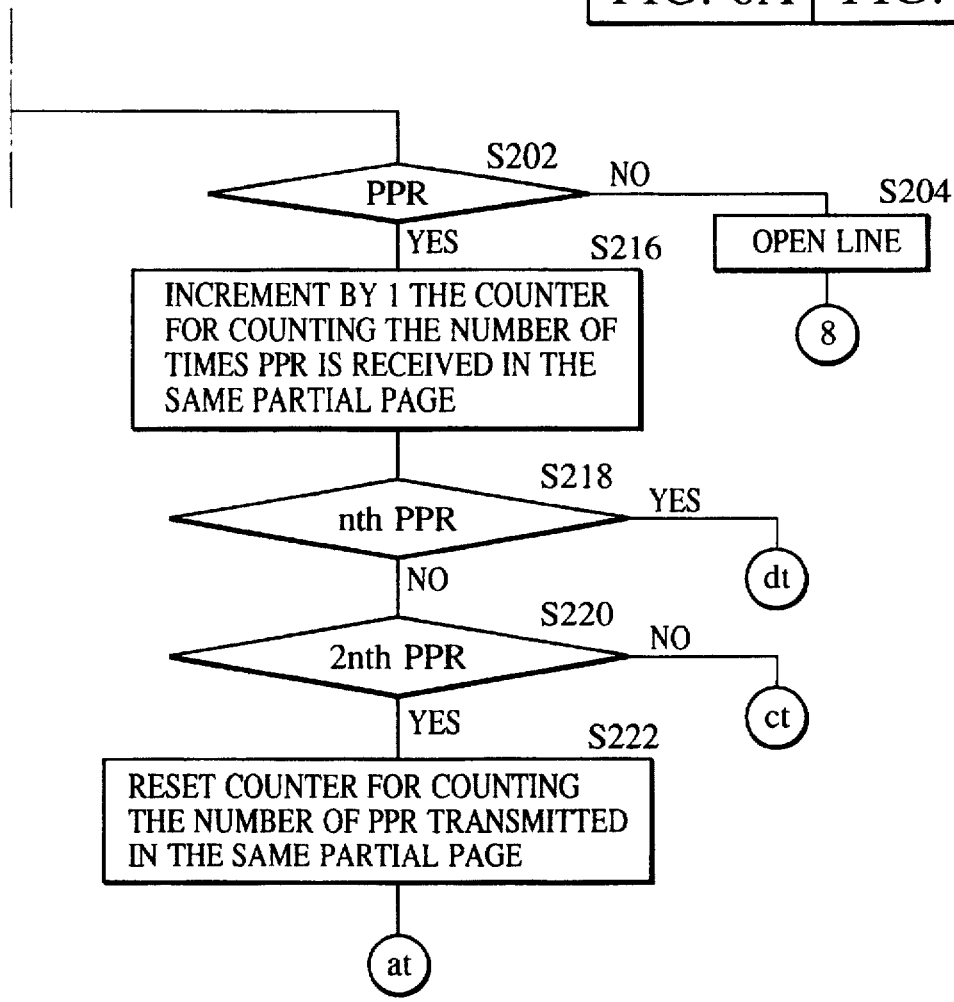

DATA COMMUNICATION APPARATUS FOR SETTING THE BAUD RATE AND BIT RATE OF A MODEM AND PERFORMING DATA COMMUNICATION AT THE SET BAUD RATE AND BIT RATE

BACKGROUND OF THE INVENTION

1. Field of the Invention

The present invention relates to a data communication apparatus for setting the baud rate and the bit rate of a modem and performing data communication at the set baud rate and bit rate.

2. Description of the Related Art

As an example of this type of apparatus, a facsimile apparatus has hitherto been available. In a facsimile apparatus, a receiver first informs a transmitter of the bit rate (transmission speed) of its modem. Then, the transmitter selects its own bit rate which matches the highest bit rate of the receiver's modem, and informs the receiver of the selected bit rate. When the bit rate is determined in this way, a test is made as to whether communication is possible at that bit rate by performing a training check sequence. When the result of the training check sequence is OK, a CFR (Reception Ready Confirmation) is sent out from the receiver to the transmitter, and thereafter images are communicated at that bit rate. When the result of the training check sequence is not OK, the receiver sends out an FTT (Training Failure) signal to the transmitter. The transmitter, upon receiving the FTT signal, selects a bit rate which is slower by one level, informs the receiver of this fact, and executes the training check sequence once more. In this way, by the time the CFR signal is sent out to the transmitter from the receiver, the bit rate has been reset. After the training check sequence is terminated and one page of image signals is communicated at the set bit rate, the receiver determines the image quality of the page of the image signals received. If the image quality is good, the receiver sends out an MCF (Message Confirmation) signal to the transmitter. The transmitter, upon receiving the MCF signal, transmits the image signals of the next page at the same bit rate as that of the previous page if an image of the next page is present. If the image quality is poor, the receiver sends out an RTP (Retrain Positive) or RTN (Retrain Negative) to the transmitter. The transmitter, upon receiving RTP or RTN, sets the bit rate to be lower by one level, and transmits the next page or transmits the same page again.

The above-described change in the bit rate is for decreasing (falling back) the bit rate, but the bit rate cannot be increased even if the line quality is improved while communications are taking place.

In the above-described facsimile apparatus, only the bit rate is changed, but the baud rate cannot be changed, for example, at the same bit rate.

SUMMARY OF THE INVENTION

In view of the above-described problems, it is an object of the present invention to improve a data communication apparatus.

It is another object of the present invention to provide a data communication apparatus which changes a baud rate and a bit rate according to line quality.

It is still another object of the present invention to provide a data communication apparatus which changes the baud rate according to a line condition checked signal and changes the bit rate according to the quality of data.

The above and further objects, aspects and novel features of the invention will more fully appear from the following detailed description when read in connection with the accompanying drawings.

DETAILED DESCRIPTION OF THE PREFERRED EMBODIMENT

An embodiment of the present invention will be described below in detail with reference to the accompanying drawings. A description will be provided using a facsimile apparatus as an example of a data communication apparatus.

Figure 1:
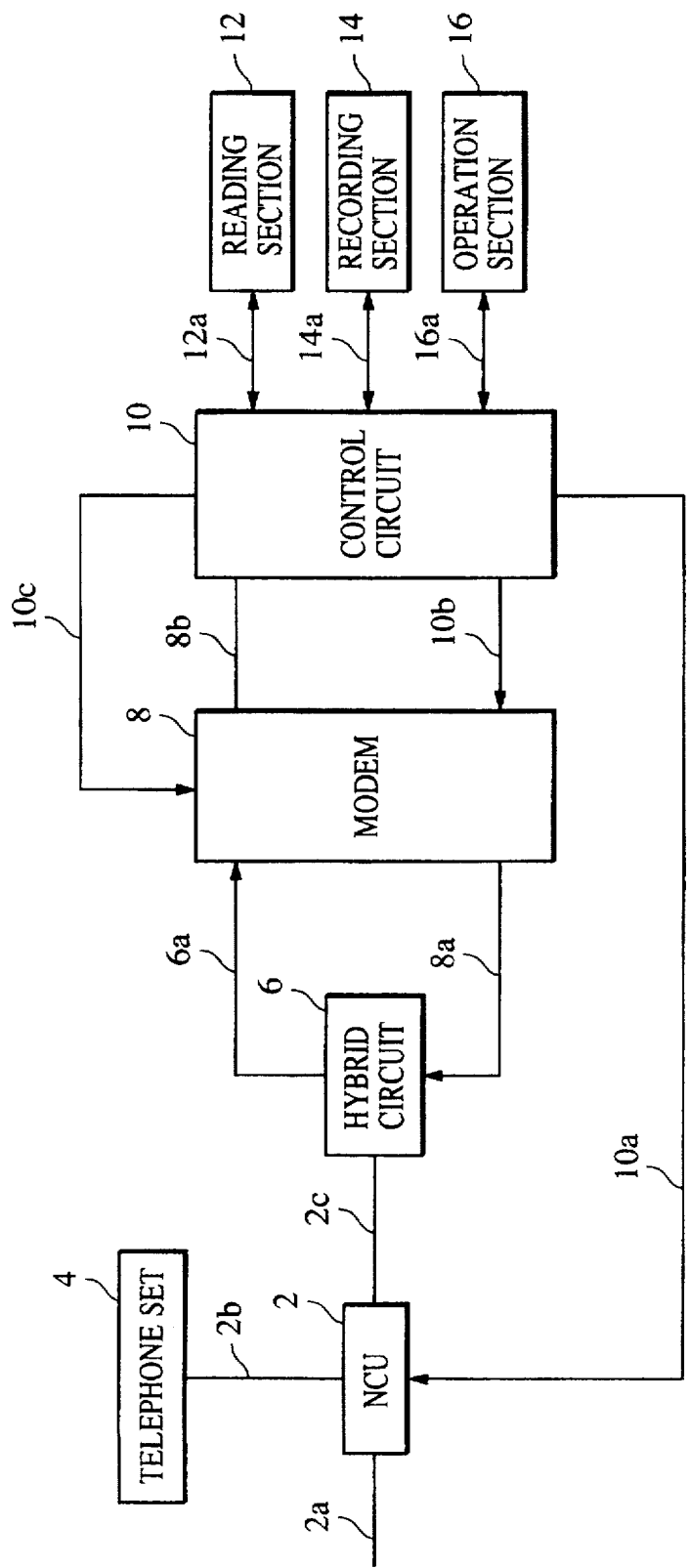
FIG. 1 is a block diagram illustrating an embodiment of the present invention.

FIG. 1 is a block diagram illustrating the construction of a facsimile apparatus in accordance with the embodiment of the present invention.

Referring to FIG. 1, in a network control unit (NCU) 2 having a communication line (CML) relay, the line of a telephone network is connected to a terminal in order to use the telephone network for data communication or the like. The NCU 2 controls the connection of the telephone network, switches to the data communication path, and maintains the loop. The NCU 2 also connects a telephone line 2a to the side of a telephone set 4 if the signal level of a signal line 10a is "0", and connects the telephone line 2a to the facsimile apparatus side if the signal level is "1". In the normal state, the telephone line 2a is connected to the telephone set 4.

A hybrid circuit 6 separates signals of the transmission system from signals of the reception system, sends out transmission signals of a signal line 8a to the telephone line 2a via the NCU 2, receives signals from another party, and sends out signals to a modem 8 via a signal line 6a.

The modem (modulator and demodulator) 8 has the modulating and demodulating functions of ITU-T Recommendations V21, V27ter, V29, V17, V8 and V34. The modes thereof are set via a signal line 10c. Information output to a signal line 10b is modulated in the specified mode and output to the signal line 8a. Modulated data output to the signal line 6a is input and demodulated in the specified mode, and is output to the signal line 8a.

A control circuit 10 consists of a microcomputer, a ROM, a RAM and the like, and controls the entire facsimile apparatus.

A reading section 12 reads an original document to be transmitted or the like using a CCD or the like, and outputs the read image data through a signal line 12a. A recording section 14, consisting of an LBP or the like, prints out data, such as a received image, which is input from a signal line 14a.

An operation section 16 inputs signals from various keys and makes a display. The operation section 16 has a ten-key panel, a start key, a set key, one-touch keys, abbreviated keys, function keys, an LCD display section, and the like. Information about which key is pressed is output from a signal line 16a.

With the above-described construction, the facsimile apparatus of this embodiment performs the operation described below.

During communication in the error correction mode (ECM), in a case where the transmitter sends out a signal indicating that a next page is present and the mode will be changed, when a PPR (Partial Page Request) signal is received for the n-th time in the same partial page, the process starts with a protocol for transmitting a long training signal in order to determine the bit rate. When no PPR signal for either the n-th time (a first error rate) or the 2n-th time (a second error rate) is received in the same partial page, a short training signal is transmitted, and transmission is started at the same bit rate as that of the previous page. When a PPR signal for the 2n-th time is received in the same partial page, the process proceeds to a protocol for determining the baud rate at which facsimile information is to be transmitted, and a counter for counting the number of PPRs received within the same partial page is reset. If the MCF has been received m times (a first success rate) continuously in the same communication, the process proceeds to a protocol for transmitting a long training signal in order to determine the bit rate. If the MCF has been received 2m times (a second success rate) continuously in the same communication, the process proceeds to a protocol for determining the baud rate at which facsimile information is transmitted, and a counter for counting the number of times MCF has been received in the same communication is reset. Since the mode must be changed when the MCF has been received other than m and 2m times continuously in the same communication, the process starts with a protocol for determining the bit rate on the basis of the state in which the previous page has been received.

In a case where the transmitter sends out a signal indicating that the mode will not be changed, when the MCF has been received other than m and 2m times continuously in the same communication, the mode need not be changed, and therefore the short training signal is transmitted and transmission is started at the same bit rate as that of the previous page. When the MCF has been received other than the above times, the same control as when a signal indicating that a next page is present and the mode will be changed is effected. After signals of the last page are sent out from the transmitter, when the PPR is received, the same control as when the signal indicating that a next page is present and the mode will be changed is effected; when the MCF is received, the line is immediately released after DCN is sent out. That is, a different protocol is executed according to the error rate and the success rate in the communication. Although in the above description the error rate and the success rate are determined according to the number of times the PPR is received and the number of times the MCF has been received continuously, the error rate and the success rate may be determined by analyzing the contents of the PPR.

Figure 2:
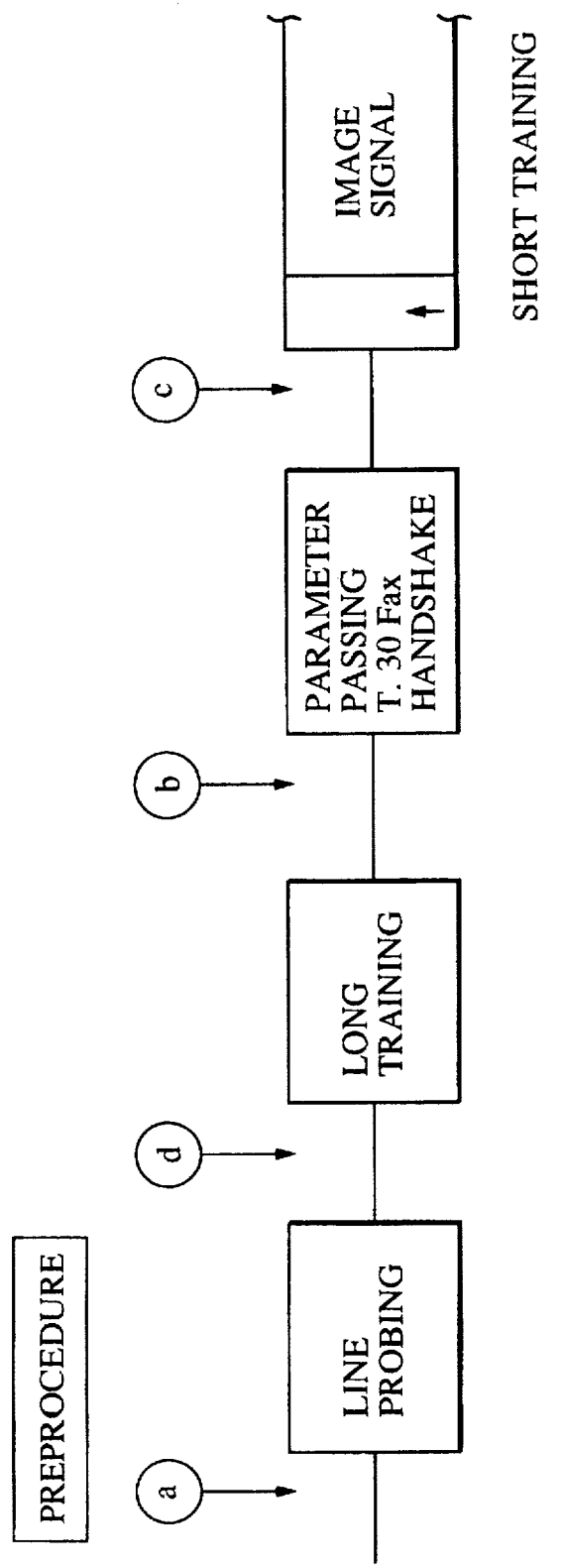
FIG. 2 shows an example of a communication sequence in the preprocedure in accordance with the embodiment of the present invention.

FIG. 2 shows an example of a communication sequence in the preprocedure in accordance with the embodiment.

Referring to FIG. 2, transmission from point "a", i.e., line probing, is a first protocol for determining the baud rate at which facsimile information is transmitted. Transmission from point "d", i.e., long training, is a second protocol for transmitting the long training signal in order to determine the bit rate. Transmission from point "b", i.e., passing of parameters, such as the bit rate, and exchange of conventional procedure signals of T30, is a third protocol for determining the bit rate on the basis of the state in which the previous page has been received. Transmission from point "c", i.e., short training, is a fourth protocol for transmitting the short training signal and starting transmission at the same bit rate as that of the previous page.

A description will be given below of the determination and the meaning of the change of the baud rate and the bit rate which are performed in this embodiment.

(1) Determination of the Baud Rate

An available band is recognized on the basis of the line probing signal. When this band is wide, the baud rate is set to be high, and when the band is narrow, the baud rate is set to be low. When the baud rate is high, since the number of bits per one modulation at the same bit rate is small, there is the advantage in that the number of error bits when an error occurs is small.

(2) Determination of the Bit Rate

The long training is performed at the baud rate determined on the basis of the line probing signal, and the bit rate at which transmission is possible is determined.

(3) Meaning of Changing the Bit Rate

The available band is the same. However, in a case where the S/N or the like is changed, and the bit rate at which transmission is possible is changed, taking measures against this change is effective.

(4) Meaning of Changing the Baud Rate

When the available band is changed, changing the baud rate is effective.

The control operation in this embodiment will be described below. FIGS. 3 to 10 are flowcharts illustrating the control operation of the control circuit 10 in this embodiment.

Figure 3:
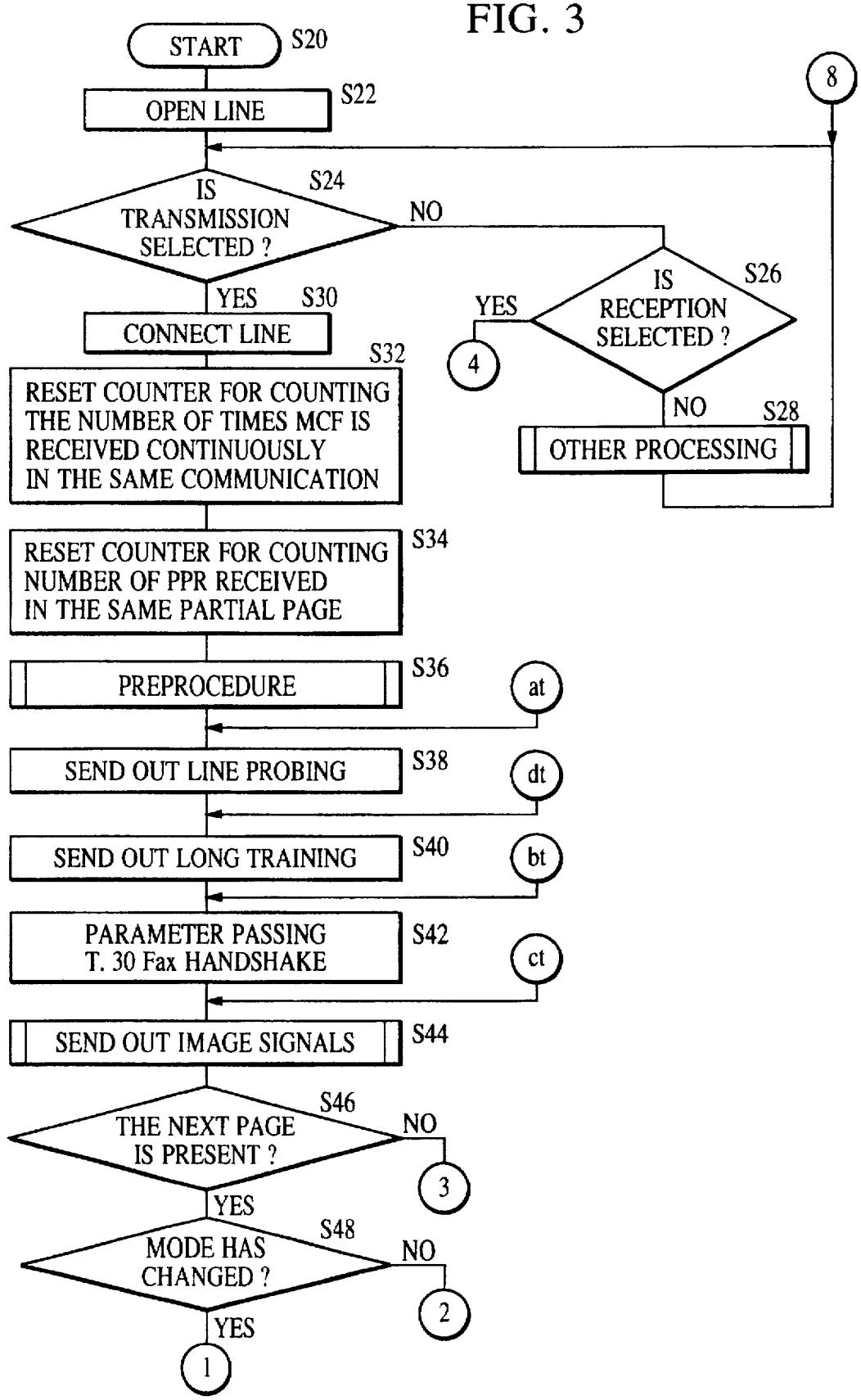
FIG. 3 is a flowchart illustrating the operation of the embodiment of the present invention.
Figure 4:
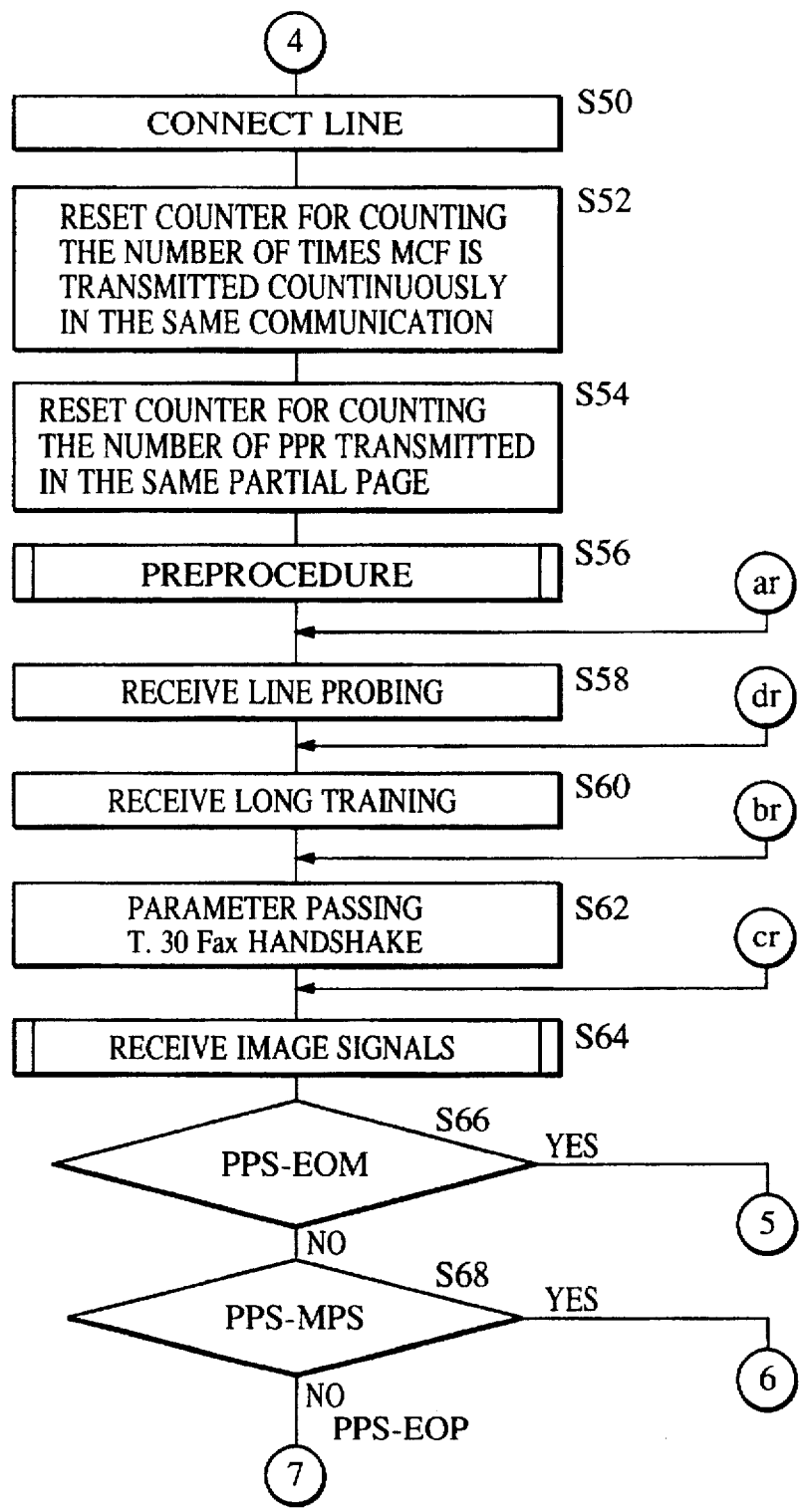
FIG. 4 is a flowchart illustrating the operation of the embodiment of the present invention.

Referring first to FIG. 3, in step S22, a level "0" signal is output to the signal line 10a in order to turn off a communication line (CML) relay.

In steps S24 and S26, a check is made to determine if transmission or reception has been selected. When transmission is selected, the process proceeds to step S30; when reception is selected, the process proceeds to step S50. If neither of them is selected, the process proceeds to step S28 where other processing is performed.

In step S30, a level "1" signal is output to the signal line 10a in order to turn on the CML. In step S32, the counter (continuous MCF reception counter) for counting the number of times the MCF has been received in the same communication is reset.

In step S34, a counter (PPR reception counter) for counting the number of PPRs received in the same partial page is reset.

In step S36, the preprocedure is executed. In step S38, the line probing signal is sent out. In step S40, the long training is sent out. In step S42, parameters are passed, and handshaking of T30, such as NSF (Non-Standard Facilities), CSI (Called Subscriber Identification), DIS (Digital Identification Signal), NSS (Non-Standard Facilities Set-up), TSI (Transmitting Subscriber Identification), or DCS (Digital Command Signal) is performed. In step S44, image signals are sent out just after the short training signal is sent out.

In steps S46 and S48, a check is made to determine if a next page is present and the mode will be changed, respectively. If a next page is present and the mode will be changed, the process proceeds to step S70. If a next page is present and the mode will not be changed, the process proceeds to step S190. If there is no next page, the process proceeds to step S230.

In step S50, a level "1" signal is output to the signal line 10a in order to turn on the CML relay. In step S52, a counter (continuous MCF transmission counter) for counting the number of times the MCF has been transmitted continuously in the same communication is reset. In step S54, a counter (PPR transmission counter) for counting the number of PPRs transmitted in the partial page is reset.

Next, in step S56, the preprocedure is executed. In step S58, the line probing signal is received. In step S60, the long training signal is received. In step S62, parameters are passed, and handshaking of T30, such as NSF, CSI, DIS, NSS, TSI or DCS, is performed. In step S64, image signals are received.

In steps S66 and S68, the procedure information is received. When a PPS-EOM (Partial Page Signal - End of Message) is received, the process proceeds to step S114. When a PPS-MPS (Partial Page Signal - Multi Page Signal) is received, the process proceeds to step S140. When the PPS-EOP (Partial Page Signal - End of Procedure) is received, the process proceeds to step S166.

Figure 5A:
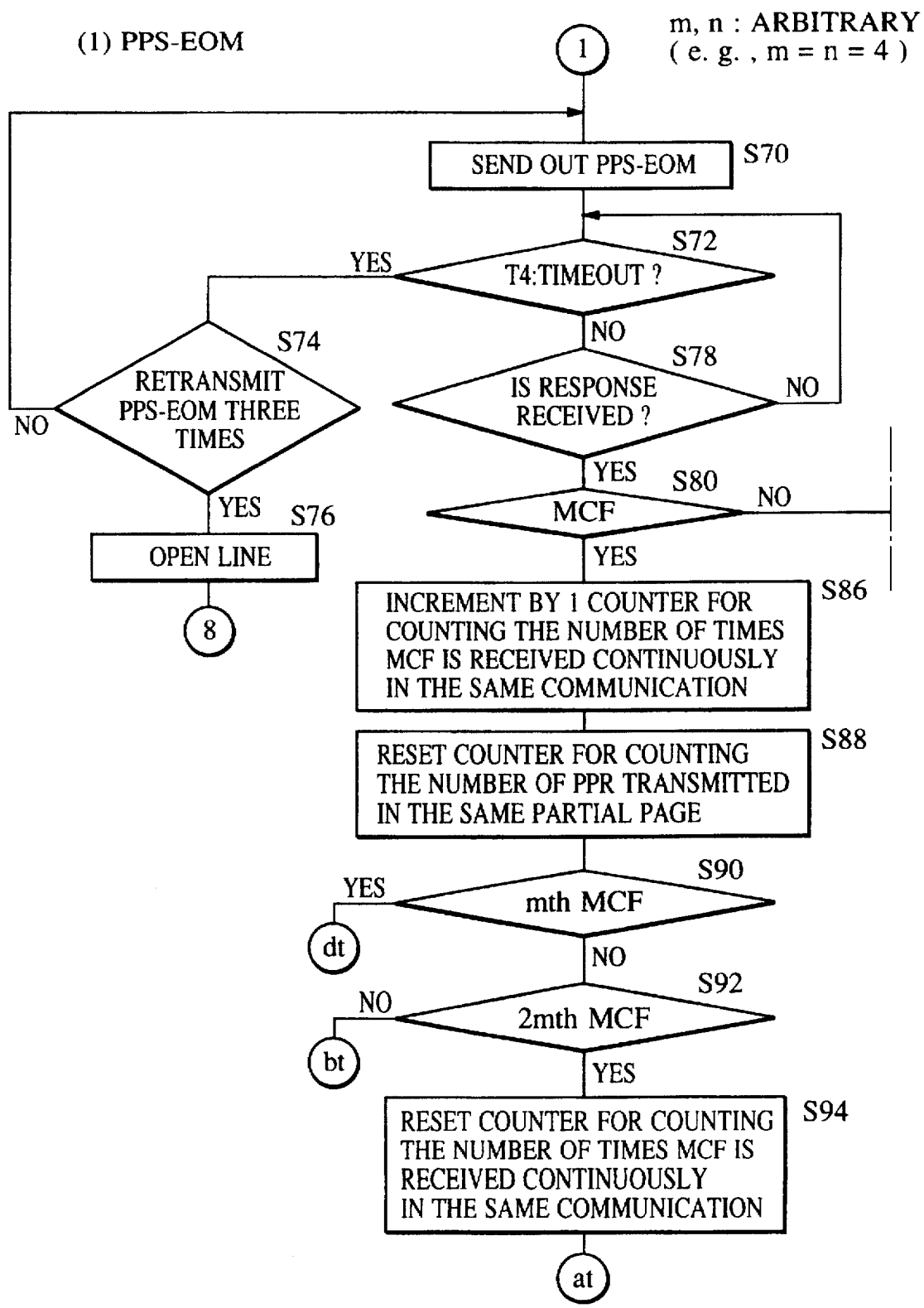
FIG. 5 is a flowchart illustrating the operation of the embodiment of the present invention.

Referring to FIG. 5, in step S70, the PPS-EOM is sent out. In step S72, a check is made to determine if T4 (3 sec) has passed after the PPS-EOM has been sent out. When T4 (3 sec) has passed, the process proceeds to step S74; if not, the process proceeds to step S78.

In step S74, a check is made to determine if the PPS-EOM has been retransmitted three times. If the PPS-EOM has been retransmitted three times, the process proceeds to step S76 where the CML relay is turned off. If the PPS-EOM has not been retransmitted three times, the process returns to step S70 where the PPS-EOM is sent out again.

Step S78 indicates whether a response has been received. If a valid procedure signal is detected, the procedure signal is checked in steps S80 and S82. If the signal is an MCF, the process proceeds to step S86; if the signal is a PPR, the process proceeds to step S96; if the signal is other than the above signal, the process proceeds to step S84 where the CML is turned off to release the line.

In step S86, a counter for counting the number of times the MCF has been received continuously in the same communication is incremented by 1. In step S88, a counter for counting the number of PPRs received in the partial page is reset.

In steps S90 and S92, the value of the counter for counting the number of times the MCF has been received continuously in the same communication is checked. If the value is m, the process proceeds to "dt" (step S40), and if the value is 2m, the process proceeds to step S94 where the counter for counting the number of times the MCF has been received continuously in the same communication is reset, and then the process proceeds to "at" (step S38). If the value is neither m nor 2m, the process proceeds to "bt" (step S42).

In step S96, a counter for counting the number of times the PPR has been received in the same partial page is incremented by 1. In steps S98 and S100, the value of the counter is checked. If the value is n, the process proceeds to "dt" (step S40); if the value is 2n, the process proceeds to step S102 where the counter for counting the number of PPRs received in the same partial page is reset, and then the process proceeds to "at" (step S38). If the value of the counter for counting the number of PPRs is not 2n in step S100, the process proceeds to "ct" (step S44).

Figure 6A:
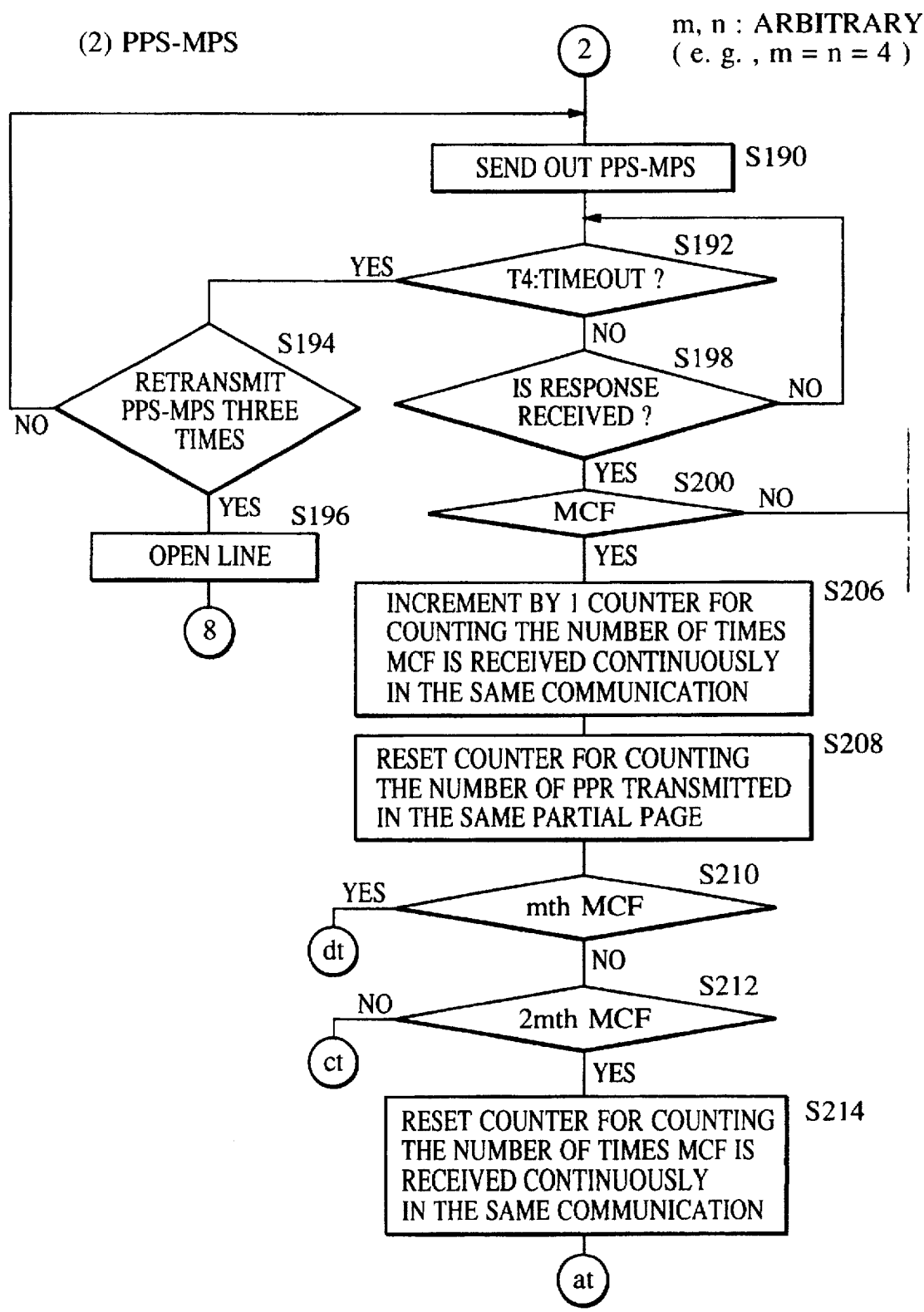
FIG. 6 is a flowchart illustrating the operation of the embodiment of the present invention.

Referring to FIG. 6, in step S190, the PPS-MPM is sent out. In step S192, a check is made to determine if T4 (3 sec) has passed after the PPS-MPS has been sent out. If T4 (3 sec) has passed, the process proceeds to step S194; if not, the process proceeds to step S192.

In step S194, a check is made to determine if the PPS-MPS has been retransmitted three times. If the PPS-MPS has been retransmitted three times, the process proceeds to step S196 where the CML relay is turned off to release the line. If the PPS-MPS has not been retransmitted three times, the process proceeds to step S198.

In step S198, a response is received. If a valid procedure signal is detected, the signal is checked in steps S200 and S202. If the signal is an MCF, the process proceeds to step S206; if the signal is a PPR, the process proceeds to step S216; and if the signal is neither an MCF nor a PPR, the process proceeds to step S204 where the CML relay is turned off to release the line.

Steps S206 to S214 are the same as steps S88 to S94 except that if the number of times the MCF has been received continuously in the same communication is neither m nor 2m, the process proceeds to "ct" (step S44). Steps S216 to S222 are the same as steps S96 to S102.

Figure 7:
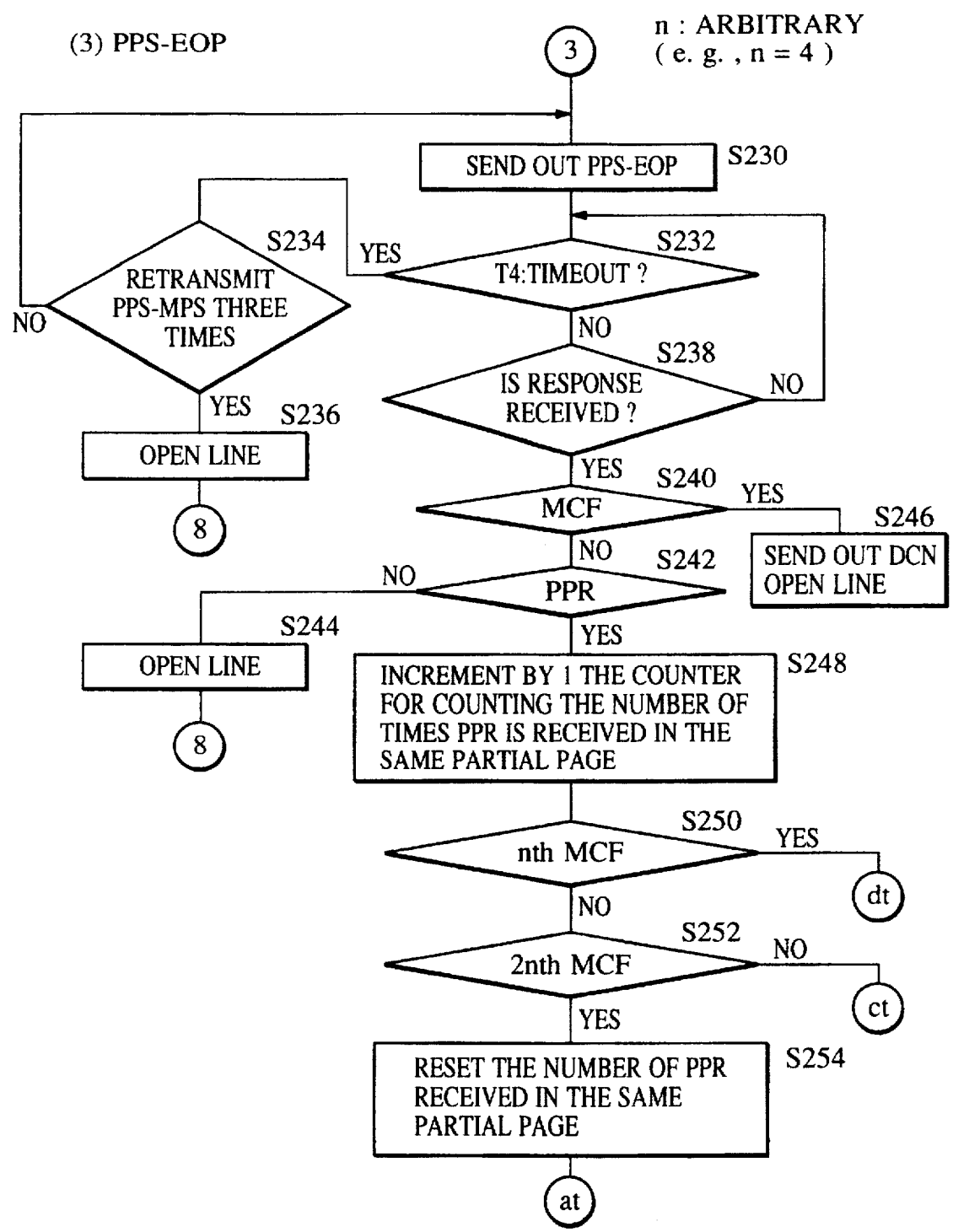
FIG. 7 is a flowchart illustrating the operation of the embodiment of the present invention.

Referring to FIG. 7, in step S230, a PPS-EOM is sent out. In step S232, a check is made to determine if T4 (3 sec) has passed after the PPS-EOM has been sent out. If T4 (3 sec) has passed, the process proceeds to step S234; if T4 (3 sec) has not passed, the process proceeds to step S238.

In step S234, a check is made to determine if the PPS-EOM has been retransmitted three times. If the PPS-EOM has been retransmitted three times, the process proceeds to step S236 where the CML relay is turned off to release the line. If the PPS-EOM has not been retransmitted three times, the process proceeds to step S230 where the PPS-EOM is sent out.

In step S238, a response is received. When a valid procedure signal is detected, the signal is checked in steps S240 and S242. If the signal is an MCF, the process proceeds to step S246 where a DCN (Disconnect) signal is sent out, and the CML relay is turned off. If the signal is a PPR, the process proceeds to step S248; if the signal is neither the MCF nor the PPR, the process proceeds to step S244 where the line is released.

In step S248, a counter for counting the number of times the PPR has been received in the same partial page is incremented by 1.

In steps S250 and S252, the value of the counter for counting the number of PPRs received in the same partial page is checked. If the value of the counter is n, the process proceeds to "dt" (step S40); if the value is 2n, the process proceeds to step S254; and if the value is neither n nor 2n, the process proceeds to "ct" (step S44).

In step S254, the number of PPRs received in the same partial page is reset, and then the process proceeds to "at".

Figure 8:
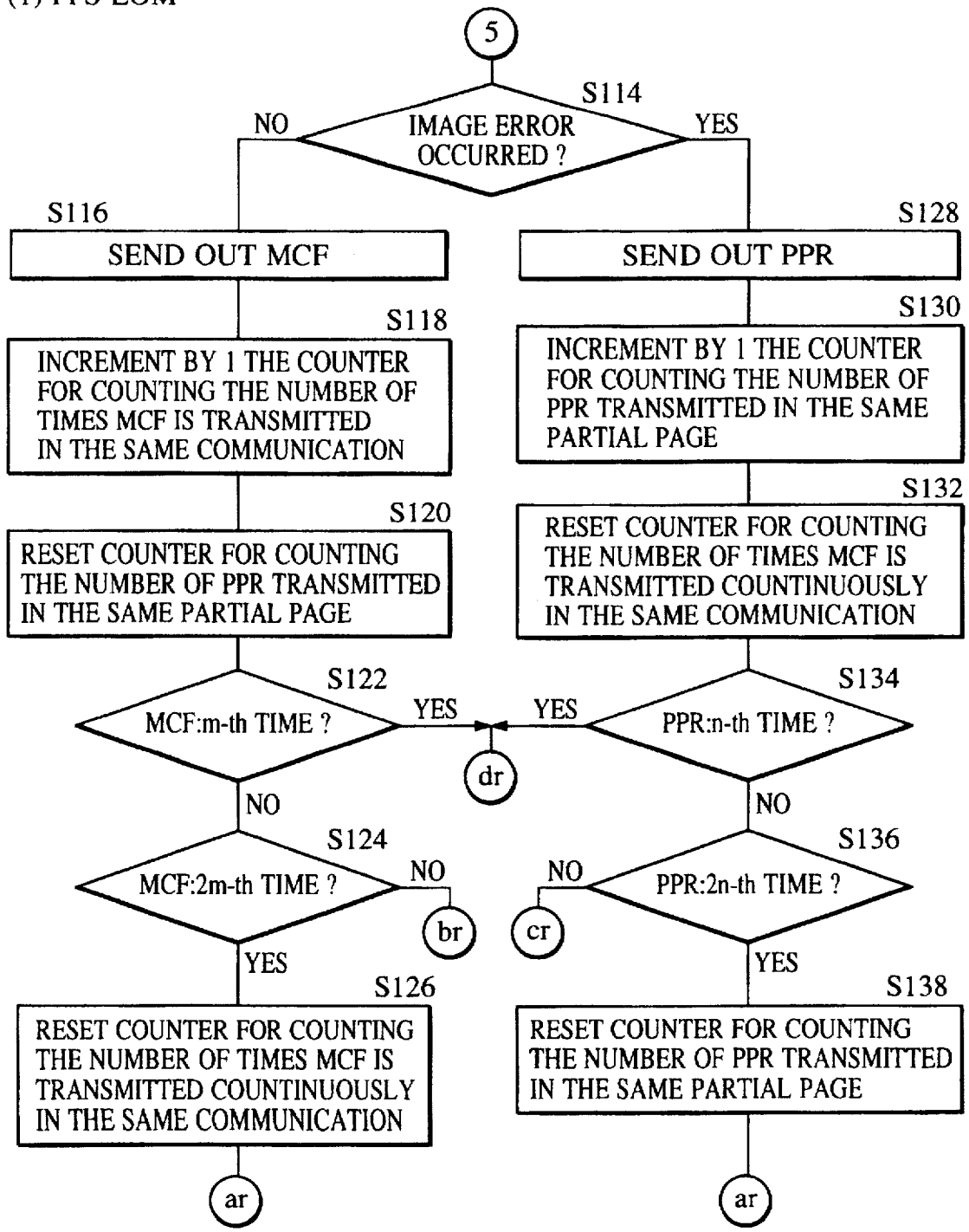
FIG. 8 is a flowchart illustrating the operation of the embodiment of the present invention.

In step S114 of FIG. 8, a check is made to determine if an image error has not occurred. If an image error has not occurred, the process proceeds to step S116 where the MCF is sent out. If an image error has occurred, the process proceeds to step S128 where the PPR is sent out.

In step S118, the continuous MCF transmission counter is incremented by 1. In step S120, the PPR transmission counter is reset.

In steps S122 and S124, the continuous MCF transmission counter is checked. If the counter indicates m times of transmission of MCF, the process proceeds to "dr"; if the counter indicates 2m times of transmission of MCF, the process proceeds to S126 where the continuous MCF transmission counter is reset, and then the process proceeds to "ar" (step S58). If the counter indicates neither m nor 2m times of transmission of MCF, the process proceeds to "br" (step S62). In step S130, the PPR transmission counter is incremented by 1. In step S132, the continuous MCF transmission counter is reset.

In steps S134 and S136, the PPR transmission counter is checked. If the counter indicates n times of transmission of PPR, the process proceeds to "dr" (step S60). If the counter indicates 2n times of transmission of PPR, the process proceeds to step S138 where the PPR transmission counter is reset, and then the process proceeds to "ar" (step S58). If the counter indicates neither n nor 2n times of transmission of PPR, the process proceeds to "cr" (step S64).

Figure 9:
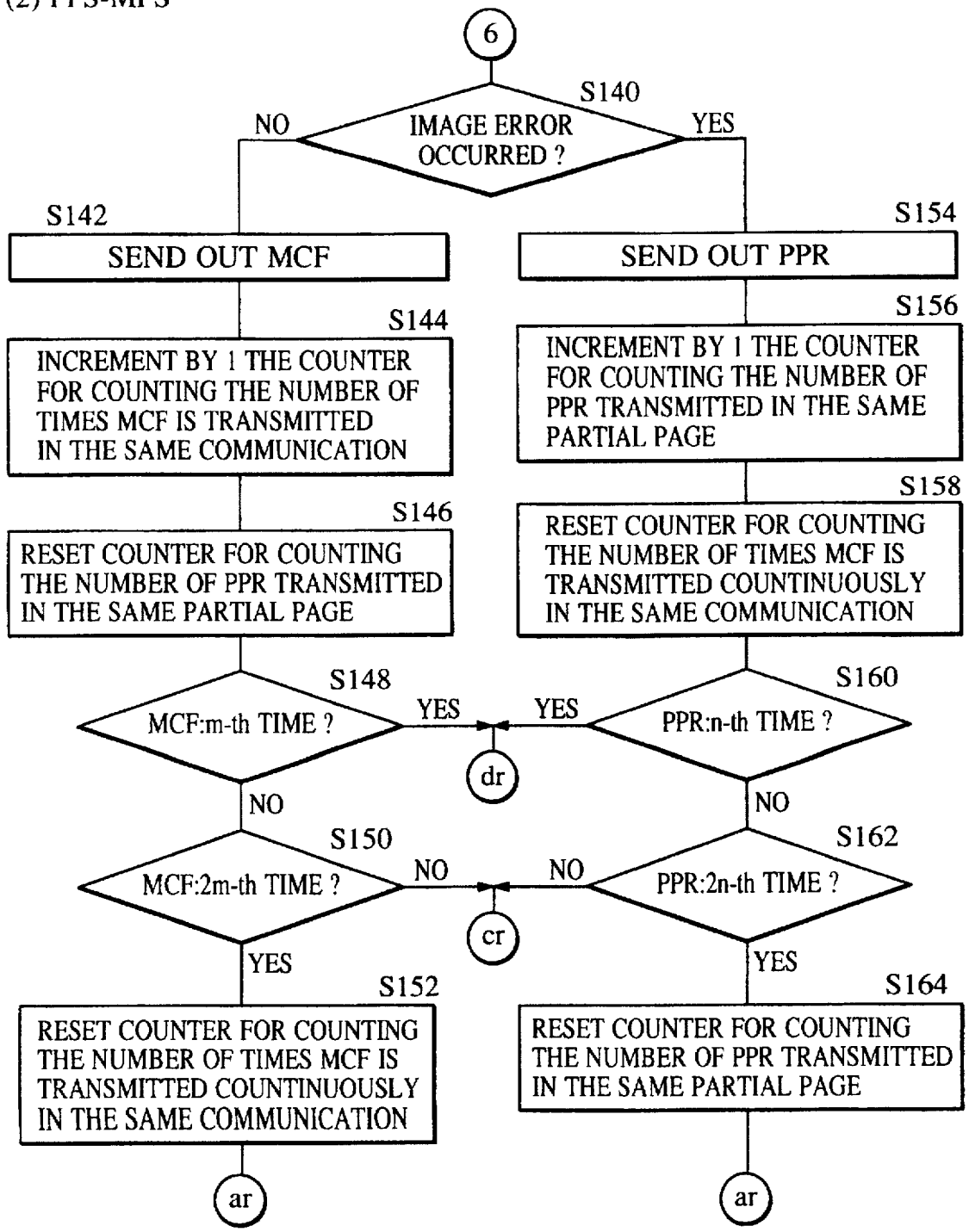
FIG. 9 is a flowchart illustrating the operation of the embodiment of the present invention.

In step S140 of FIG. 9, a check is made to determine if an image error has occurred. If there is no image error, the process proceeds to step S142 where the MCF is sent out. If there is an image error, the process proceeds to step S154 where the PPR is sent out.

After the MCF is sent out in step S142, the continuous MCF transmission counter is incremented by 1 in step S144, and the PPR transmission counter is reset in step S146.

In steps S148 and S150, the continuous MCF transmission counter is checked. If the counter indicates neither m times of transmission of MCF, the process proceeds to "dr" (step S60); if the counter indicates 2m times of transmission of MCF, the process proceeds to step S152 where the continuous MCF reception counter is reset, and then the process proceeds to "ar" (step S58). If the counter indicates neither m nor 2m times of transmission of MCF, the process proceeds to "cr". In step S156, the PPR transmission counter is incremented by 1. In step S158, the continuous MCF transmission counter is reset.

In steps S160 and S162, the PPR transmission counter is checked. If the counter indicates n times of transmission of PPR, the process proceeds to "dr" (step S60). If the counter indicates 2n times of transmission of PPR, the process proceeds to step S164 where the PPR transmission counter is reset, and then the process proceeds to "ar" (step S58). If the counter indicates neither n nor 2n times of transmission of PPR, the process proceeds "cr" (step S64).

Figure 10:
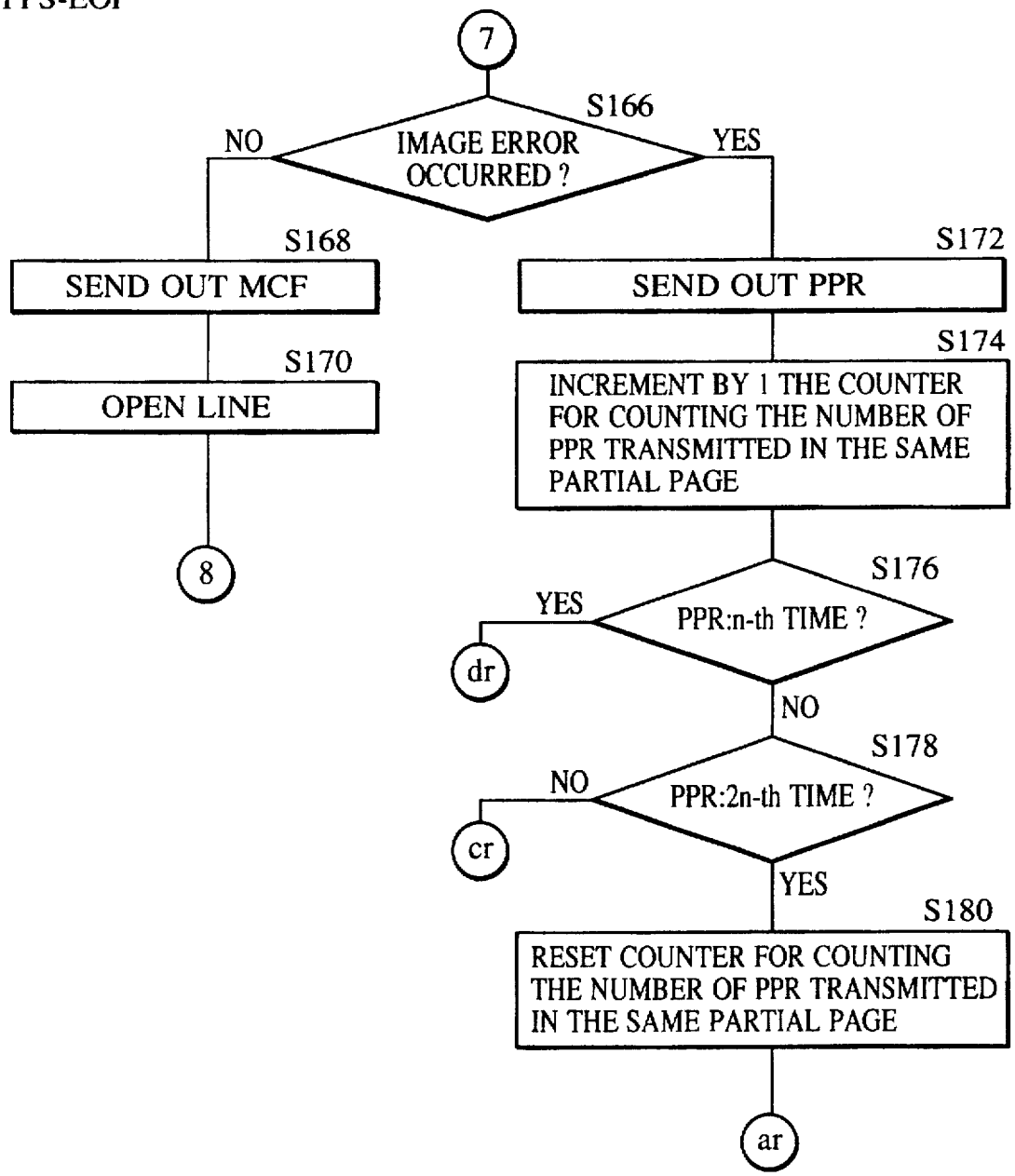
FIG. 10 is a flowchart illustrating the operation of the embodiment of the present invention.

In step S166 of FIG. 10, a check is made to determine if an image error has occurred. If there is no image error, the process proceeds to step S168 where the MCF is sent out, and the CML is turned off in step S170, and then the process proceeds to step S24. If there is an image error, the process proceeds to step S172 where the PPR is sent out.

In step S174, the PPR transmission counter is reset. In steps S176 and S178, the PPR transmission counter is checked. If the counter indicates n times of transmission of PPR, the process proceeds to "dr" (step S60). If the counter indicates 2n times of transmission of PPRs, the process proceeds to step S180 where the PPR transmission counter is reset, and then process proceeds to "ar" (step S58). If the counter indicates neither n nor 2n times of transmission of PPR, the process proceeds to "cr" (step S64).

As has been described up to this point, according to this embodiment of the present invention, it becomes possible to change the baud rate on the basis of a line condition checked signal between pages, to change the bit rate with the baud rate fixed to a constant value by performing the long training, and to change the bit rate with the baud rate fixed to a constant value on the basis of the state in which the previous page is received. Thus, it is possible to flexibly change the transmission speed and perform optimum transmission.

The present invention can be applied, in addition to the above-described facsimile apparatus, to various data communication apparatuses, such as computer-controlled data communication apparatus.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A data communication apparatus for performing data communication via a modem having plural kinds of baud rates and plural kinds of bit rates, comprising:

baud rate setting means for setting a baud rate of said modem by performing a first protocol;

bit rate setting means for setting a bit rate of said modem by performing a second protocol;

control means for selectively controlling said baud rate setting means and said bit rate setting means in accordance with a condition of the data communication;

long training means for performing a long training sequence for training said modem at the baud rate set by said baud rate setting means; and short training means for performing a short training sequence for training said modem at the bit rate set by said bit rate setting means just before sending a page of data, wherein said control means has a first procedure which sequentially performs the baud rate setting process, the long training sequence, the bit rate setting process and the short training sequence, a second procedure which sequentially performs the long training sequence, the bit rate setting process and the short training sequence, a third procedure which sequentially performs the bit rate setting process and the short training sequence, and a fourth procedure which performs the short training sequence, and wherein said control means selects one of the first, second, third and fourth procedures in accordance with the condition of data communication when a page of data is communicated.

2. A data communication apparatus according to claim 1, wherein said control means selects one of the first, second, third and fourth procedures in accordance with an error rate in the data communication.

3. A data communication apparatus according to claim 2, wherein said control means determines the error rate in accordance with a number of retransmissions of data.

4. A data communication apparatus according to claim 1, wherein said control means selects one of the first, second, third and fourth procedures in accordance with an error rate and a success rate in the data communication.

5. A data communication method for performing data communication via a modem having plural kinds of baud rates and plural kinds of bit rates, comprising the steps of:

setting a baud rate of the modem by performing a first protocol;

performing a long training sequence for training the modem at the set baud rate;

setting a bit rate of the modem by performing a second protocol after setting the baud rate;

performing a short training sequence for training the modem at the set bit rate just before performing data communication;

performing data communication at the set baud rate and the set bit rate; and selectively resetting the baud rate and the bit rate in accordance with a condition of the data communication, wherein said resetting step selectively performs said baud rate setting step, said long training sequence, said bit rate setting step and said short training sequence in accordance with the condition of the data communication.

6. A data communication method according to claim 5, wherein the condition of the data communication is an error rate in the data communication.

7. A data communication method according to claim 6, wherein the error rate is determined in accordance with a number of retransmissions of data.

8. A data communication method according to claim 5, wherein the condition of the data communication is an error rate and a success rate in the data communication.

* * * * *